(12) United States Patent
Caldwell et al.

(10) Patent No.: US 7,664,134 B2
(45) Date of Patent: Feb. 16, 2010

(54) PROGRAMMABLE Q-ORDERED SETS FOR IN-BAND LINK SIGNALING

(75) Inventors: Maurice Caldwell, Robbinsville, NJ (US); Howard Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1544 days.

(21) Appl. No.: 10/667,604

(22) Filed: Sep. 23, 2003

(65) Prior Publication Data

US 2005/0063413 A1 Mar. 24, 2005

(51) Int. Cl.
*H04L 12/43* (2006.01)

(52) U.S. Cl. ............... 370/459; 370/426; 370/522; 370/536

(58) Field of Classification Search ........... 370/230, 370/235, 236, 236.1, 236.2, 241.1, 242, 248, 370/449–451, 462; 714/1, 2, 703, 724, 735, 714/737; 710/100

See application file for complete search history.

(56) References Cited

U.S. PATENT DOCUMENTS

| | | | | |
|---|---|---|---|---|
| 6,961,347 | B1 * | 11/2005 | Bunton et al. | 370/465 |
| 7,272,679 | B2 * | 9/2007 | Taborek et al. | 710/305 |
| 7,305,047 | B1 * | 12/2007 | Turner | 375/316 |
| 7,376,146 | B2 * | 5/2008 | Beverly et al. | 370/465 |
| 7,394,825 | B2 * | 7/2008 | Kim et al. | 370/466 |
| 7,447,953 | B2 * | 11/2008 | Vogt | 714/716 |
| 2003/0099260 | A1 * | 5/2003 | Bunton | 370/535 |
| 2005/0063310 | A1 | 3/2005 | Caldwell et al. | |
| 2005/0135421 | A1 * | 6/2005 | Chang et al. | 370/474 |

OTHER PUBLICATIONS

Draft Supplement to IEEE Std. 802.3, 46. Reconciliation Sublayer (RS) and 10 Gigabit Media Independent Interface (XGMII), IEEE Draft PSO2.3ae/D5.0, 2002, pp. 271-343.*

InfiniBand Architecture Release 1.0, "Chapter 5: Link/Phy Interface," vol. 2, Physical Specifications, Oct. 2000, pp. 65-131.*

* cited by examiner

*Primary Examiner*—Donald L Mills
(74) *Attorney, Agent, or Firm*—Sterne, Kessler, Goldstein & Fox P.L.L.C.

(57) ABSTRACT

In a network having nodes that operate according to a protocol that defines a node as being in an idle mode when the node is not transmitting or receiving a packet, a method of communicating between nodes during the idle mode. A message formatted according to the protocol is generated. The message is different from messages predefined by the protocol for transmission during the idle mode. For example, the message can comprise a first portion that reports a link status condition. The message can further comprise a second portion that reports a cause of the link status condition. The message is transmitted from a first node of the network when the first node is in the idle mode. The message is received at a second node of the network when the second node is in the idle mode.

30 Claims, 10 Drawing Sheets

| XGMII TXC | XGMII TXD | PCS code-group | Description |
|---|---|---|---|
| 0 | 00 through FF | Dxx.y | Normal data transmission |
| 1 | 07 | K28.0 or K28.3 or K28.5 | Idle in \|\|I\|\| |
| 1 | 07 | K28.5 | Idle in \|\|T\|\| |
| 1 | 9C | K28.4 | Sequence |
| 1 | FB | K27.7 | Start |
| 1 | FD | K29.7 | Terminate |
| 1 | FE | K30.7 | Error |
| 1 | Other value in Table 36-2 | See Table 36-2 | Reserved XGMII character |
| 1 | Any other value | K30.7 | Invalid XGMII character |
| NOTE—Values in TXD column are in hexadecimal. | | | |

Table 36-2-Valid special code-groups

| Code Group Name | Octet Value | Octet Bits HGF EDCBA | Current RD - abcdei fghj | Current RD + abcdei fghj | Notes |
|---|---|---|---|---|---|
| K28.0 | 1C | 000 11100 | 001111 0100 | 110000 1011 | 1 |
| K28.1 | 3C | 001 11100 | 001111 1001 | 110000 0110 | 1,2 |
| K28.2 | 5C | 010 11100 | 001111 0101 | 110000 1010 | 1 |
| K28.3 | 7C | 011 11100 | 001111 0011 | 110000 1100 | 1 |
| K28.4 | 9C | 100 11100 | 001111 0010 | 110000 1101 | 1 |
| K28.5 | BC | 101 11100 | 001111 1010 | 110000 0101 | 2 |
| K28.6 | DC | 110 11100 | 001111 0110 | 110000 1001 | 1 |
| K28.7 | FC | 111 11100 | 001111 1000 | 110000 0111 | 1,2 |
| K23.7 | F7 | 111 10111 | 111010 1000 | 000101 0111 | |
| K27.7 | FB | 111 11011 | 110110 1000 | 001001 0111 | |
| K29.7 | FD | 111 11111 | 101110 1000 | 010001 0111 | |
| K30.7 | FE | 111 11110 | 011110 1000 | 100001 0111 | |
| NOTE 1 — Reserved. | | | | | |
| NOTE 2 — Contains a comma. | | | | | |

FIG. 5

| Code | Ordered_Set | Number of code-groups | Encoding |
|---|---|---|---|
| \|\|I\|\| | Idle | | Substitute for XGMII Idle |
| \|\|K\|\| | Sync column | 4 | /K28.5/K28.5/K28.5/K28.5/ |
| \|\|R\|\| | Skip column | 4 | /K28.0/K28.0/K28.0/K28.0/ |
| \|\|A\|\| | Align column | 4 | /K28.3/K28.3/K28.3/K28.3/ |
| | Encapsulation | | |
| \|\|S\|\| | Start column | 4 | /K27.7/Dx.y/Dx.y/Dx.y/[a] |
| \|\|T\|\| | Terminate column | 4 | Terminate code-group in any lane |
| \|\|T$_0$\|\| | Terminate in Lane 0 | 4 | /K29.7/K28.5/K28.5/K28.5/ |
| \|\|T$_1$\|\| | Terminate in Lane 1 | 4 | /Dx.y/K29.7/K28.5/K28.5/[a] |
| \|\|T$_2$\|\| | Terminate in Lane 2 | 4 | /Dx.y/Dx.y/K29.7/K28.5/[a] |
| \|\|T$_3$\|\| | Terminate in Lane 3 | 4 | /Dx.y/Dx.y/Dx.y/K29.7/[a] |
| | Control | | |
| /E/ | Error code-group | 1 | /K30.7/ |
| | Link Status | | |
| \|\|Q\|\| | Sequence ordered_set | 4 | /K28.4/Dx.y/Dx.y/Dx.y/[a] |
| \|\|LF\|\| | Local Fault signal | 4 | /K28.4/D0.0/D0.0/D1.0/ |
| \|\|RF\|\| | Remote Fault signal | 4 | /K28.4/D0.0/D0.0/D2.0/ |
| \|\|Qrsvd\|\| | Reserved | 4 | \|\|LF\|\| and \|\|RF\|\| |
| | Reserved | | |
| \|\|Fsig\|\| | Signal ordered_set | 4 | /K28.2/Dx.y/Dx.y/Dx.y/ [a,b] |
| [a]/Dx.y/ indicates any data code-group.<br>[b]/Reserved for INCITS T11. | | | |

FIG. 6

PROGRAMMABLE Q-ORDERED SETS FOR IN-BAND LINK SIGNALING

CROSS-REFERENCE TO RELATED APPLICATIONS

This patent application is related to the following commonly owned, co-pending U.S. utility patent application: "Verification and Correction of 10GBASE-X Lane Routing Between Nodes" by M. Caldwell et al., U.S. application Ser. No. 10/667,385, which is filed concurrently herewith and incorporated herein by reference.

BACKGROUND OF THE INVENTION

1. Field of the Invention

The present invention relates in general to local area networks, and specifically to in-band link signaling with programmable Q-ordered sets.

2. Background Art

Ethernet protocol is a popular technology used to implement Local Area Networks (LANs), and was originally developed in the late 1970s. In 1985, Ethernet was adopted by the Standards Board of the Institute of Electrical and Electronics Engineers Standards Association (IEEE-SA) as IEEE Std 802.3® The Ethernet protocol provides a process whereby a node can communicate with its link partner(s) to manage their shared portions of the LAN. Typically, this is accomplished by messages communicated between nodes when their transceivers are in idle mode. For example, a node experiencing a fault can communicate this condition to its link partner(s) (i.e., local fault). A node can also detect a fault condition in a link partner (i.e., remote fault). Additionally, messages can be used to report the specific message handling capabilities of a link partner, the status of synchronization between link partners, and the like.

The IEEE-SA has approved an amendment for "Media Access Control (MAC) Parameters, Physical Layers, and Management Parameters for 10 Gb/s Operation" to IEEE Std 802.3. The amended standard is designated IEEE Std 802.3ae™. In idle mode, IEEE Std 802.3ae uses ordered sets of code groups: (1) to verify that code group reception of each lane is synchronized, (2) to check alignment of each lane relative to the others, (3) to provide for clock rate compensation, (4) to relay local fault signals, and (5) to relay remote fault signals. What is needed is a mechanism that extends the ability, beyond the specific features provided for by IEEE Std 802.3ae, of nodes to communicate with each other when their transceivers are in idle mode.

BRIEF SUMMARY OF THE INVENTION

The present invention relates to in-band link signaling with programmable Q-ordered sets. In an embodiment, the present invention comprises a method for communicating, using a 10 Gigabit Media Independent Interface (XGMII) in a local area network, between a first node coupled to a first transceiver and a second node coupled to a second transceiver when the first and the second transceivers are in idle mode. An A-ordered set from the first node is transmitted. An ordered set from the first node is transmitted after the A-ordered set is transmitted. The ordered set complies with IEEE Std 802.3ae™ specifications for ordered sets. The ordered set is different from the ordered sets predefined by the IEEE Std 802.3ae specifications. The ordered set can be a Q-ordered set. A code group in lane 3 of the Q-ordered set can be 000000001 or 000000010. The ordered set can be preprogrammed within a Physical Coding Sublayer (PCS) of the first node, capable of being programmed by a user, or both.

The ordered set can be stored in a memory at the PCS. More than one ordered set can be stored in a queue in the memory. The ordered sets stored in the queue in the memory can be differentiated. A first ordered set can be caused to be transmitted before a second ordered set according to a hierarchy. In the hierarchy, an ordered set from the ordered sets predefined by the IEEE Std 802.3ae specifications can have precedence over the ordered set, vice versa, or both.

The ordered set can be generated by a Reconciliation Sublayer (RS) of the first node or by the PCS. The ordered set can be generated upon recognizing or detecting a link status condition. More specifically, the ordered set can be generated upon recognizing or detecting a cause of the link status condition. The ordered set can be used to identify the cause of the link status condition. If the ordered set is generated by the RS, the ordered set is transmitted from the RS to the PCS. The ordered set is received and identified at the PCS. An ordered set from the ordered sets predefined by the IEEE Std 802.3ae specifications can also be identified at the PCS.

The ordered set can be identified at the second node. An ordered set from the ordered sets predefined by the IEEE Std 802.3ae specifications can also be identified at the second node. An action can be performed in response to the identified ordered set.

If a third transceiver, coupled to a third node, is positioned between the first and the second transceivers, then the ordered set from the first node can be received at the third transceiver and transmitted from the third transceiver to the second node. The third node can be incapable of identifying the ordered set.

In another embodiment, the present invention comprises a network device for implementing an IEEE Std 802.3ae PCS. The network device includes a PCS service interface, a Physical Medium Attachment (PMA) service interface, Encoders, Decoders, a first logic circuit, a second logic circuit, a third logic circuit, and a memory. The Encoders are coupled to the PCS service interface and are configured to encode an XGMII character into code groups. The PMA service interface is coupled to the Encoders. The Decoders are coupled between the PCS service interface and the PMA service interface and are configured to decode the code groups into an XGMII character.

The first logic circuit is coupled between the PCS service interface and the PMA service interface and is configured to identify an ordered set received from an RS. The ordered set complies with IEEE Std 802.3ae specifications for ordered sets. The ordered set is not from the ordered sets predefined by the IEEE Std 802.3ae specifications. The memory is coupled to the first logic circuit and is configured to store the ordered set. The second logic circuit is coupled to the first logic circuit and is configured to ensure that the ordered set is transmitted in place of a K-ordered set or an R-ordered set during a clock cycle following a transmission of an A-ordered set. The third logic circuit is coupled between the PCS service interface and the PMA service interface and is configured to identify the ordered set received from a PMA sublayer.

An identity of the ordered set can be preprogrammed within at least one of the first logic circuit and the third logic circuit. An identity of the ordered set can be capable of being programmed by a user. At least one of the first logic circuit and the third logic circuit can also be further configured to identify an ordered set from the ordered sets predefined by the IEEE Std 802.3ae specifications.

The memory can comprise a queue configured to store more than one ordered set. A fourth logic circuit can be coupled to the second logic circuit and configured to differentiate among the ordered sets stored in the queue and to cause a first ordered set to be transmitted before a second ordered set according to a hierarchy.

In yet another embodiment, the present invention comprises a method of communicating in a network between nodes in an idle mode. The nodes operate according to a protocol that defines a node as being in the idle mode when the node is not transmitting or receiving a packet. A message formatted according to the protocol is generated. The message is different from messages predefined by the protocol for transmission during the idle mode. For example, the message can comprise a first portion that reports a link status condition. The message can further comprise a second portion that reports a cause of the link status condition. The message is transmitted from a first node of the network when the first node is in the idle mode. The message is received at a second node of the network when the second node is in the idle mode.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 5 presents tables of IEEE Std 802.3ae™ valid code groups.

FIG. 6 presents a table of predefined IEEE Std 802.3ae ordered sets and special code groups.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE INVENTION

Ethernet protocol is a popular technology used to implement Local Area Networks (LANs), and was originally developed in the late 1970s. In 1985, Ethernet was adopted by the Standards Board of the Institute of Electrical and Electronics Engineers Standards Association (IEEE-SA) as IEEE Std 802.3® entitled "Carrier Sense Multiple Access with Collision Detection (CSMA/CD) Access Method and Physical Layer Specifications". Since its initial release, EEE Std 802.3 has been amended on several occasions to capture the benefits of advances in networking technologies and to drive the development of future advancements.

Figure 1:
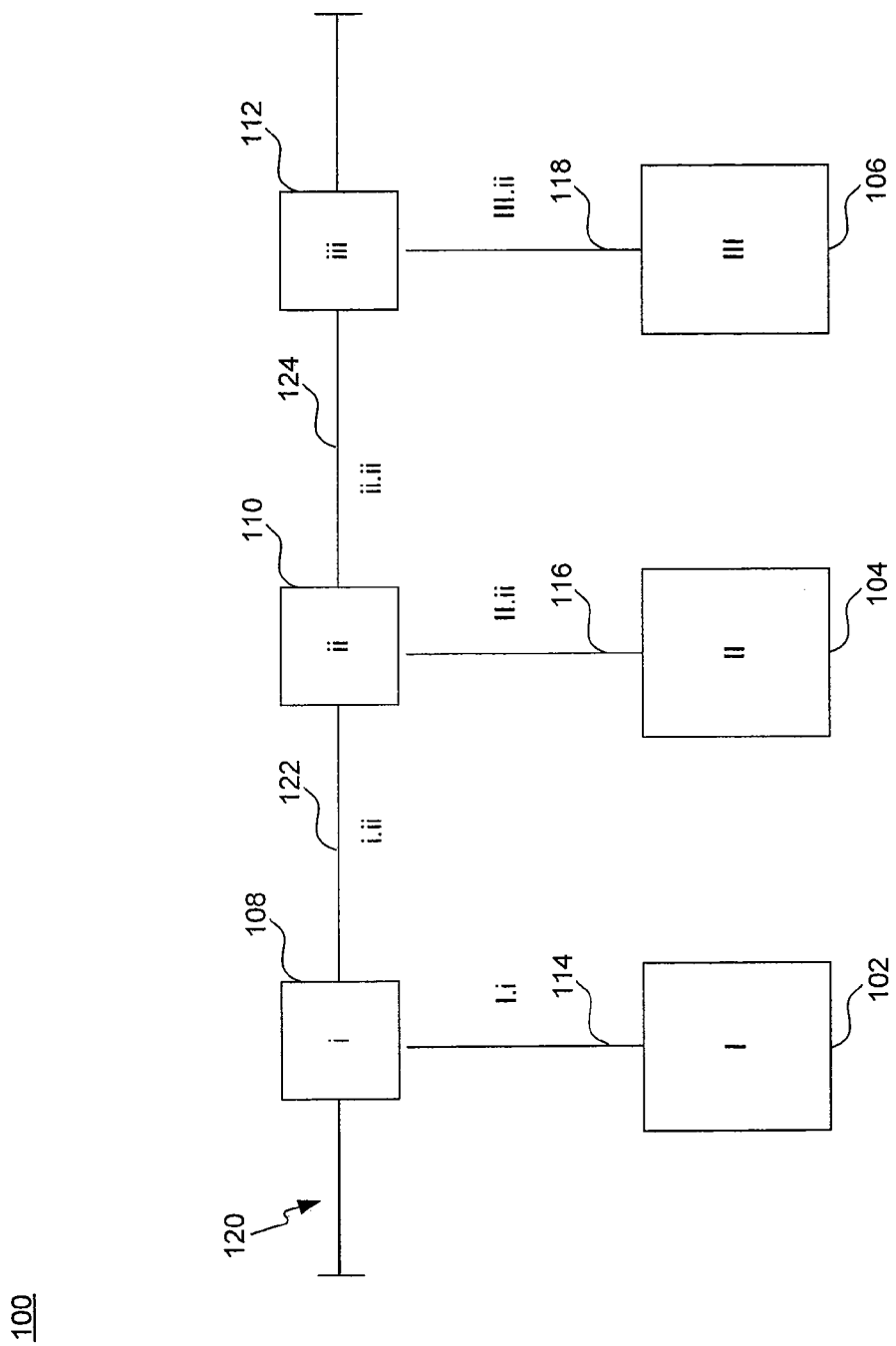
FIG. 1 illustrates an exemplary LAN 100.

FIG. 1 illustrates an exemplary LAN 100. LAN 100 includes, for example, nodes I 102, II 104, and III 106. The nodes can be personal computers, workstations, file servers, personal digital assistants, printers, modems, peripherals, terminals, and the like. Each node has a corresponding transceiver: i 108, ii 110, and iii 112. Typically, each node is coupled to its corresponding transceiver by a transceiver cable: I.i 114, II.ii 116, and III.ii 118. Each transceiver couples its corresponding node to a physical medium 120. Physical medium 120 can be realized in a variety of forms such as, but not limited to, twisted pair cable, patch cable, coaxial cable, and optical fiber. Transceivers i 108, ii 10, and iii 112 divide physical medium 120 into link segments: i.ii 122 and ii.iii 124. Nodes whose transceivers are directly connected together by a link segment without an interceding transceiver are referred to as link partners. For example, nodes I 102 and II 104 are link partners, and nodes II 104 and III 106 are link partners, but nodes I 102 and III 106 are not link partners. LAN 100 can be configured to include more or fewer nodes, more or fewer link segments between nodes, a hierarchical arrangement of nodes, or any combination of the foregoing.

The Ethernet protocol provides a process whereby, for example, data for an application at node I 102 can be formatted as a bit stream, communicated across physical medium 120 through transceivers i 108, ii 110, and iii 112, and reformatted at node III 106. Such a bit stream, with accompanying control bits, is referred to as a packet. The packet is transmitted by node I 102 and received by transceiver i 108, transmitted by transceiver i 108 and received by transceiver ii 110, transmitted by transceiver ii 110 and received by transceiver iii 112, and transmitted by transceiver iii 112 and received by node III 106. When a transceiver is in the process of transmitting or receiving a packet, the transceiver is said to be in data mode; otherwise, the transceiver is said to be in idle mode.

The Ethernet protocol also provides a process whereby a node can communicate with its link partner(s) to manage their shared portions of LAN 100. Typically, this is accomplished by messages communicated between nodes when their transceivers are in idle mode. For example, a node experiencing a fault can communicate this condition to its link partner(s) (i.e., local fault). A node can also detect a fault condition in a link partner (i.e., remote fault). Additionally, messages can be used to report the specific message handling capabilities of a link partner, the status of synchronization between link partners, and the like. Manufacturers of network devices can implement the requirements of the Ethernet processes in any manner they choose. They are also free to include other processes so long as these do not conflict with the standard. Network devices that meet these criteria are said to be compliant with the standard.

Figure 2:
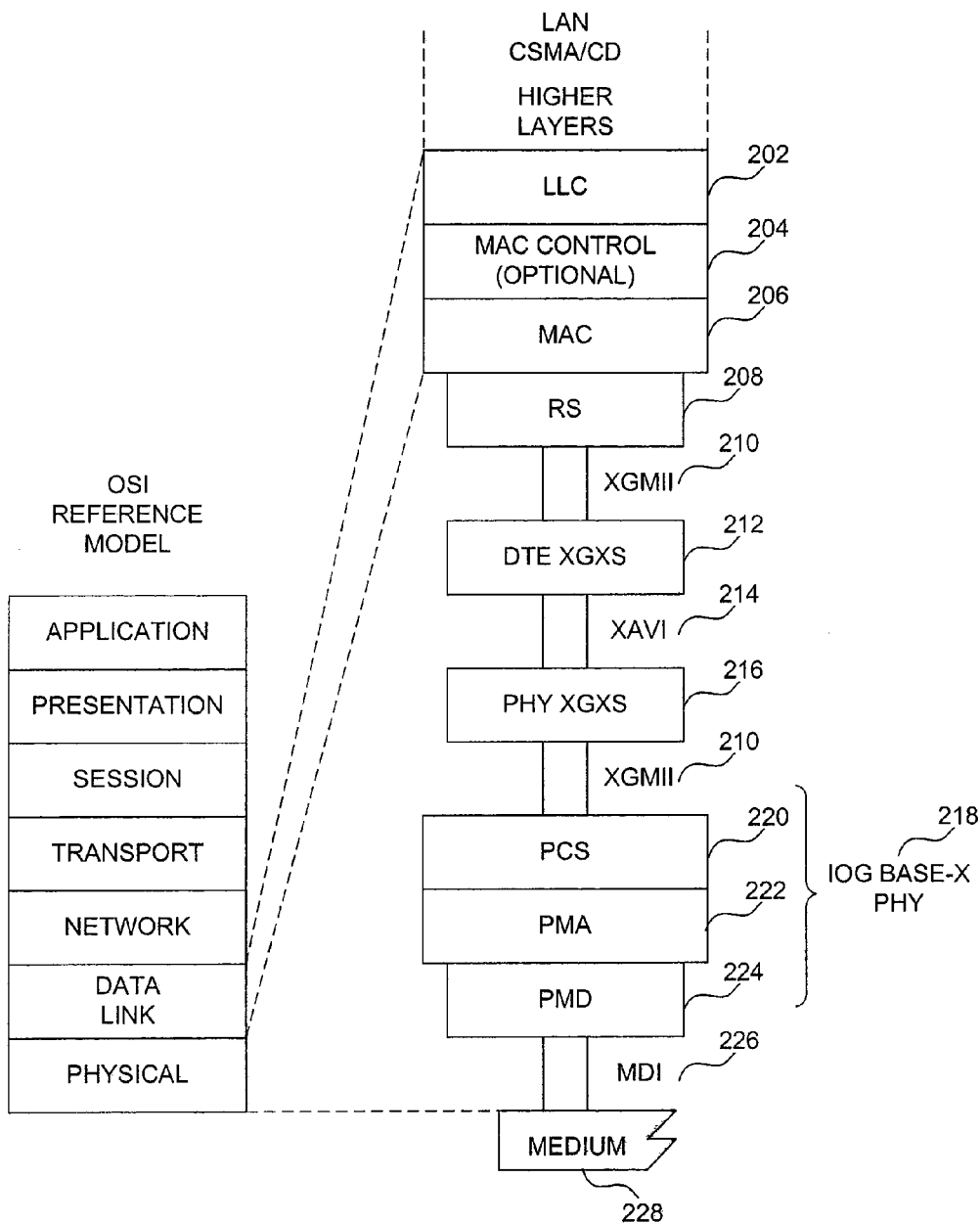
FIG. 2 shows the relationships among the 10GBASE-X sublayers 218 and other layers in the CSMA/CD LAN hierarchy 200.

The IEEE-SA has approved an amendment for "Media Access Control (MAC) Parameters, Physical Layers, and Management Parameters for 10 Gb/s Operation" to IEEE Std 802.3. The amended standard is designated IEEE Std 802.3ae™. The technology it supports is commonly referred to as "10 Gigabit Ethernet". IEEE Std 802.3ae introduces Clause 48 entitled "Physical Coding Sublayer (PCS) and Physical Medium Attachment (PMA) Sublayer, Type 10GBASE-X." IEEE Std 802.3ae, including Clause 48, is incorporated herein in its entirety by reference. 10GBASE-X refers to a family of 10 Gb/s Physical Layer implementations. FIG. 2 shows the relationships among the 10GBASE-X sublayers 218 and other layers in the CSMA/CD LAN hierarchy 200. The portions of the CSMA/CD LAN 200 hierarchy shown in FIG. 2 include Logical Link Control (LLC) 202, Media Access Control (MAC) Control 204, MAC 206, Reconciliation Sublayer (RS) 208, 10 Gigabit Media Independent Interface (XGMII) 210, Data Terminal Equipment XGMII Extender Sublayer (DTE XGXS) 212, 10 Gigabit Attachment Unit Interface (XAUI) 214, Physical XGMII Extender Sublayer (PHY XGXS) 216, 10GBASE-X Physical Layer 218, Medium Dependent Interface 226, and Medium 228. 10GBASE-X Physical Layer 218 includes PCS 220, PMA sublayer 222, and Physical Medium Dependent (PMD) sublayer 224.

Figure 3:
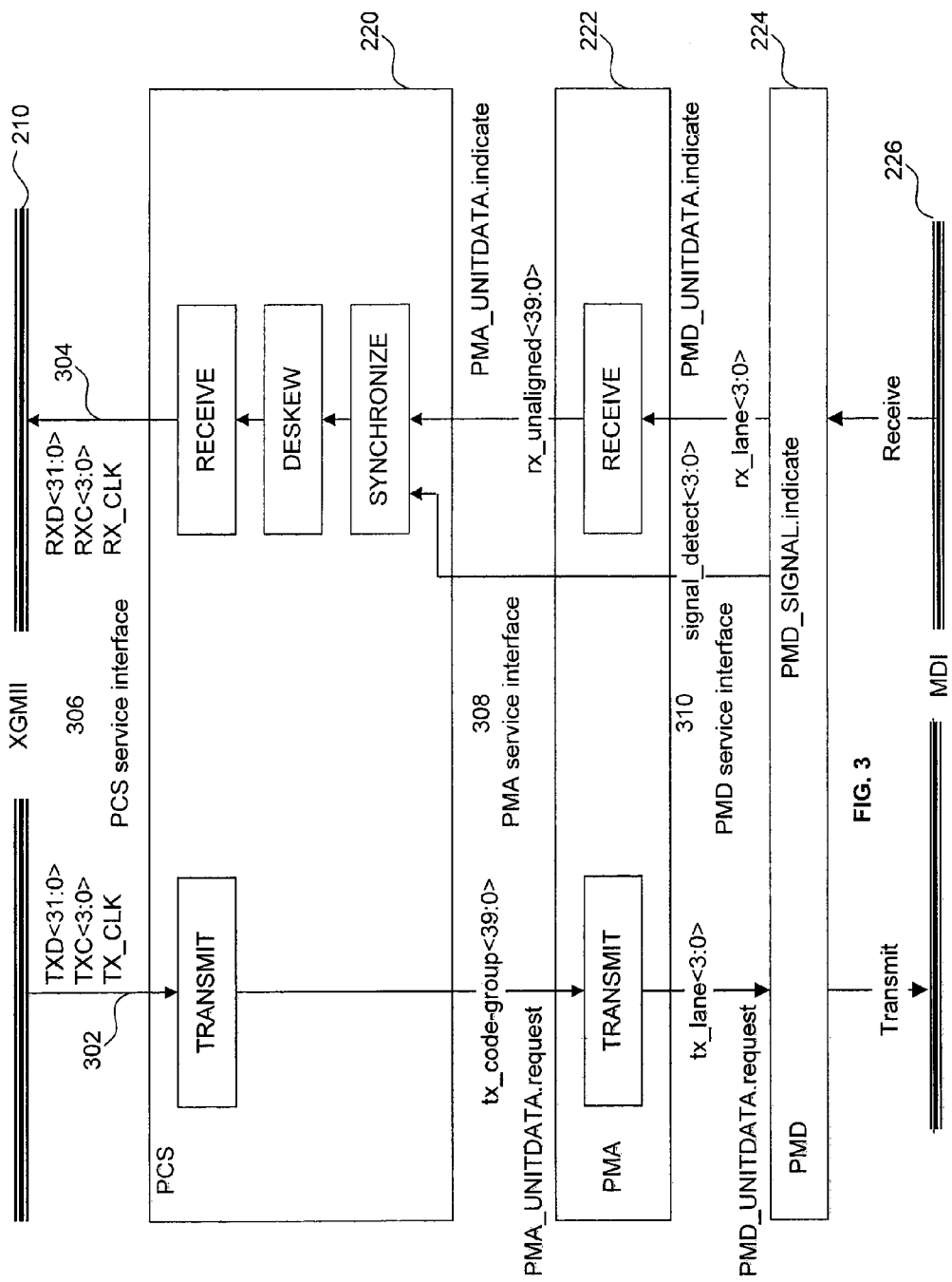
FIG. 3 shows the functions performed by the 10GBASE-X sublayers 218.

FIG. 3 shows the functions performed by the 10GBASE-X sublayers 218. The 10GBASE-X sublayers 218 include a transmit bus 302 and a receive bus 304. Communications along transmit bus 302 or receive bus 304 are said to be "in-band". Communications along other busses (not shown) of the 10GBASE-X sublayers 218 are not "in-band". The MDI 226 is used to communicate between the PMD sublayer 224 and the medium 228. In an embodiment, XGMII 210 is used to communicate between the RS 208 and the PCS 220 at a PCS service interface 306. A PMA service interface 308 is positioned between the PMA sublayer 222 and the PCS 220. A PMD service interface 310 is positioned between the PMD sublayer 224 and the PMA sublayer 222.

As shown in FIG. 2, optionally, XGXSs 212 and 216 can be used to extend the operational distance of the XGMII 210. The DTE XGXS 212 can be coupled to the RS 208 and the PHY XGXS 216 can be coupled to the 10GBASE-X Physical layer 218. The XAUI 214 can be used to communicate between the DTE XGXS 212 and the PHY XGXS 216. The XGXSs 212 and 216 and the XAUI 214 are described in Clause 47 of IEEE Std 802.3ae. Clause 47 is entitled "XGMII Extender Sublayer (XGXS) and 10 Gigabit Attachment Unit Interface (XAUI)" and is incorporated herein with IEEE Std 802.3ae in its entirety by reference.

To facilitate the use of high speed serial busses, 10GBASE-X 218 expands upon the configuration set forth in Clause 36 of IEEE Std 802.3 entitled "Physical Coding Sublayer (PCS) and Physical Medium Attachment (PMA) Sublayer, Type 1000BASE-X." IEEE Std 802.3, including Clause 36, is incorporated herein in its entirety by reference. 1000BASE-X refers to a family of 1000 Mb/s Physical Layer implementations. When transmitting from the RS 208, 1000BASE-X uses an 8B/10B Encoder in the PCS 220 to map eight-bit GMII characters to ten-bit code groups. The sequence of zeros and ones in each ten-bit code group is arranged so that it includes three to eight transitions from one state to the other. This large number of transitions prevents drift of the Phase Locked Loop (PLL) clock at the receiver and thus ensures that the PLL clock maintains synchronization with the data stream.

Figure 4:
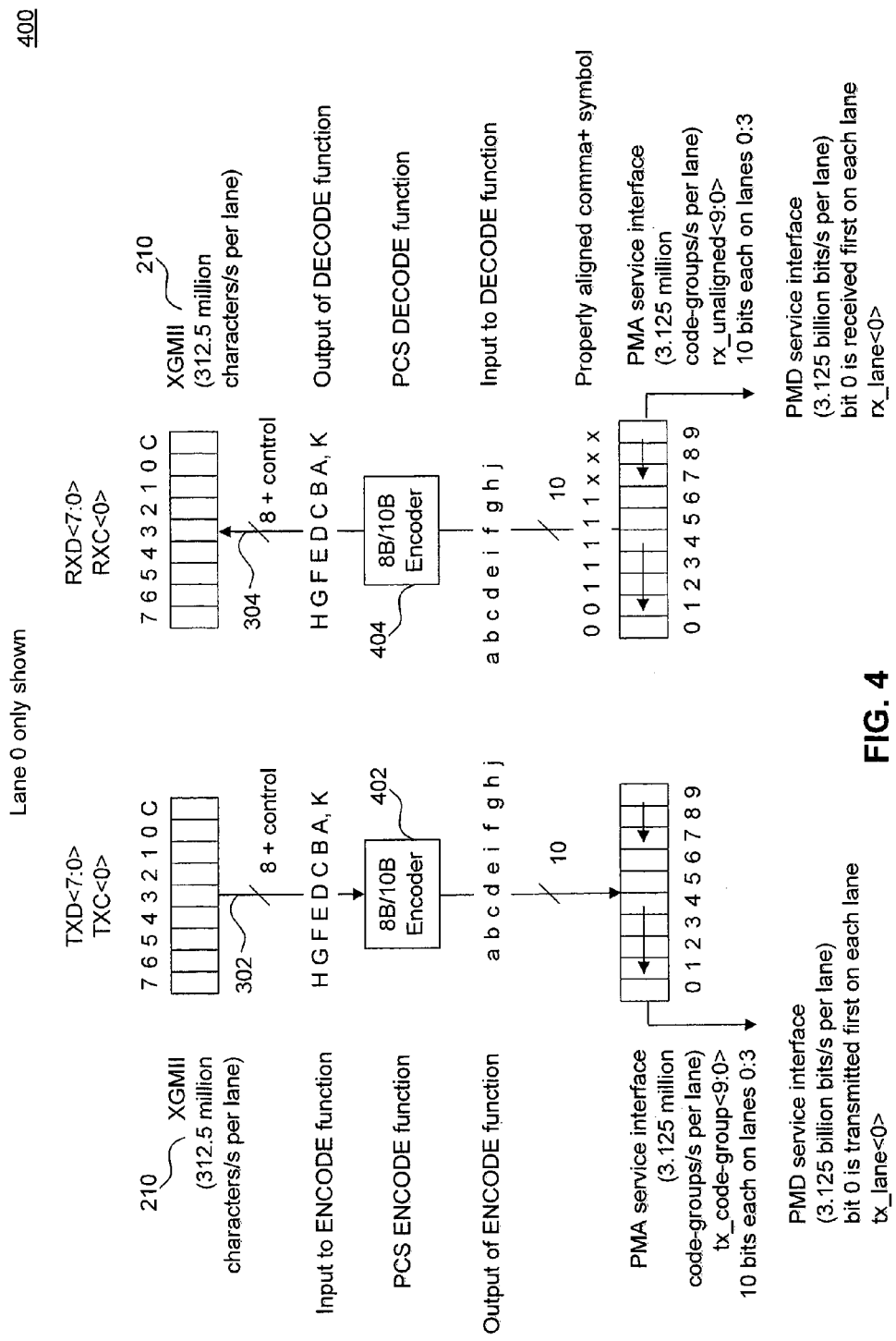
FIG. 4 illustrates the processes of mapping between XGMII characters and code groups for a single lane 400.

Likewise, 10GBASE-X 218 maps XGMII 210 (or comparably formatted) characters to code groups. However, while GMII characters are eight bits in length, XGMII 210 characters include 32 data bits, four control bits, and a clock. Therefore, whereas 1000BASE-X encodes GMII within a single lane configured to transmit at a rate of up to 125 million code groups per second, 10GBASE-X 218 encodes XGMII 210 to four lanes, each configured to transmit at a rate of up to 312.5 million code groups per second. In other words, 10GBASE-X 218 encodes 36 bits (32 data bits and four control bits) into four nine-bit lanes (eight data bits and one control bit). 10GBASE-X 218 designates its lanes as follows: lane 0, lane 1, lane 2, and lane 3. Each lane includes eight data bits and a control bit. Each lane of an XGMII character is represented as a three digit number in which the most significant digit corresponds to the control bit and the remaining two digits are a hexadecimal expression of the eight data bits. FIG. 4 illustrates the processes of mapping between XGMII characters and code groups for a single lane 400. Lane 400 includes an Encoder 402 in the PCS 220 to map the eight data bits and the control bit to a ten-bit code group. The four code groups are simultaneously transmitted in parallel across the four lanes. The converse operation is performed with a Decoder 404 when receiving a signal from the PMA sublayer 224. The ten bits in the code groups can be communicated serially in a specified order between the PMD sublayer 224 and the MDI 226. The present invention is not limited to four lanes, but could use any number of lanes.

In IEEE Std 802.3ae, code groups are differentiated as either data code groups or special code groups. In each lane, if the control bit from the XGMII character is a zero, then the resulting code group is a data code group. 10GBASE-X 218 allows for 256 different data code groups. In each lane, if the control bit from the XGMII character is a one, then the resulting code group is a special code group. Clause 48 defines valid special code groups. FIG. 5 presents tables of IEEE Std 802.3ae valid code groups. Data code groups are annotated "Dx.y", where "x" is the decimal value of XGMII bits EDCBA (see FIG. 4), and "y" is the decimal value of XGMII bits HGF (see FIG. 4). Special code groups are similarly annotated "Kx.y". Code groups with bit combinations not specified in FIG. 5 are invalid.

IEEE Std 802.3ae also uses ordered sets of code groups. Each ordered set: (1) consists of combinations of special and data code groups, (2) is four code groups in length, and (3) begins in lane 0. Special code groups and ordered sets provide capabilities for error indication, packet delineation, column fill, synchronization, deskew, clock rate compensation, and link status reporting. An ordered set can be annotated as a sequential listing of its code groups with slash symbols ("/") used to differentiate lanes. For example, the sequence /Ka.b/Dc.d/De.f/Dg.h/ indicates that code group Ka.b is assigned to lane 0, code group Dc.d is assigned to lane 1, etc. An ordered set can also be annotated by a letter with a double bar symbol ("||") before and after the designator (e.g., ||Z||). FIG. 6 presents a table of predefined IEEE Std 802.3ae ordered sets and special code groups. In this table, use of data code group "Dx.y" at a position in a sequence indicates that any data code group can be used in that lane. The ordered sets of FIG. 6 are organized in groups, which are named for the functions they support: Idle, Encapsulation, and Link Status.

Idle ordered sets are transmitted by a transceiver each clock cycle when the transceiver is in idle mode. Idle ordered sets are generated and interpreted by the PCS. Because 10GBASE-X 218 uses four lanes to transmit XGMII characters, IEEE Std 802.3ae uses Idle ordered sets: (1) to verify that code group reception of each lane is synchronized, (2) to check alignment of each lane relative to the others, and (3) to provide for clock rate compensation (10GBASE-X 218 supports multiple clock domains along a link segment). Thus, IEEE Std 802.3ae defines three specific Idle ordered sets: ||K||, ||A||, and ||R|| (see FIG. 6). Respectively, these are also referred to as a K-ordered set, an A-ordered set, and an R-ordered set. A K-ordered set, /K28.5/K28.5/K28.5/K28.5/(see FIG. 6), verifies that code group reception of each lane is synchronized. An R-ordered set, /K28.0/K28.0/K28.0/K28.0/(see FIG. 6), provides for clock rate compensation. An A-ordered set, /K28.3/K28.3/K28.3/K28.3/(see FIG. 6), checks alignment of each lane relative to the others. The standard also provides a protocol for determining when each of these Idle ordered sets is transmitted. Generally summarized, a random integer "r" is periodically generated. By the standard, r can range from 16 to 31. If r is odd, then an R-ordered set is transmitted each clock cycle, except that an A-ordered set is transmitted every $r^{th}$ cycle. If r is even, then a K-ordered set is transmitted each clock cycle, except that an A-ordered set is transmitted every $r^{th}$ cycle.

IEEE Std 802.3ae provides for link status reporting. Link status reporting is performed to identify and convey link status conditions to the RS 208 so that it can take actions to activate or deactivate a link. As described in IEEE Std 802.3 and IEEE Std 802.3ae, link status conditions can be detected or recognized. Link status reporting includes detection of link status conditions and signaling of link fault status. Link status conditions include signal status conditions, local fault signals, and remote fault signals. A fault condition may also be recognized when an error condition is detected. Because LOGBASE-X 218 uses four lanes to transmit XGMII characters, IEEE Std 802.3ae link status conditions also include deskew status conditions. Generally, link status conditions are received by the RS 208 in order to be recognized or detected. However, the PCS 220 can recognize some link status conditions. For example, a receive fault is recognized by the PCS 220 when code groups among the different lanes are skewed or misaligned.

IEEE Std 802.3ae uses Sequence ordered sets to communicate certain link status conditions. A Sequence ordered set is distinguished by having special code group K28.4 in lane 0 followed by three data code groups in lanes 1, 2, and 3: /K28.4/Dx.y/Dx.y/Dx.y/ (see FIG. 6). Special code group K28.4 is used to alert the PCS 220 that a Sequence ordered set is being transmitted. A Sequence ordered set is annotated as ||Q|| and thus is also referred to as a Q-ordered set. IEEE Std 802.3ae defines two specific Q-ordered sets: ||LF|| (/K28.4/D0.0/D0.0/D1.0/) for a local fault signal and ||RF|| (/K28.4/D0.0/D0.0/D2.0/) for a remote fault signal (see FIG. 6). Respectively, these are also referred to as an LF-ordered set and an RF-ordered set. The standard provides that, when a local or remote fault is recognized or detected by the PCS 220 or the RS 208, the appropriate Q-ordered set (e.g., ||LF|| or ||RF||) is to be generated.

If generated by the RS 208, the Q-ordered set is transmitted to the PCS 220, where the Q-ordered set is received. A Q-ordered set received or generated by the PCS 220 is transmitted in place of the K-ordered set or the R-ordered set during the clock cycle immediately following the transmission of the A-ordered set. The Q-ordered set can be stored until the next A-ordered set is transmitted. Thus, in order for a network device that implements the PCS 220 to be compliant with IEEE Std 802.3ae, the network device includes: (1) a first logic circuit to identify a Q-ordered set when it is received from the RS 208, (2) a memory to store the Q-ordered set, and (3) a second logic circuit to ensure that, in place of the K-ordered set or the R-ordered set, the Q-ordered set is transmitted during the clock cycle immediately following the transmission of the A-ordered set. The network device also includes a third logic circuit to identify a Q-ordered set when it is received from the PMA sublayer 222. A Q-ordered set received from the PMA sublayer 222 is transmitted by the PCS 220 to the RS 208. The first logic circuit can be referred to as a first Q-ordered filter; the third logic circuit can be referred to as a second Q-ordered filter.

The present invention recognizes the importance of processes that allow nodes to communicate with each other when their transceivers are in idle mode. The present invention extends this ability beyond the specific features provided for by IEEE Std 802.3ae by leveraging its protocol for transmitting Q-ordered sets. As explained above, in order to be compliant with IEEE Std 802.3ae, the network device that implements the PCS 220 includes a first Q-ordered filter to identify a Q-ordered set when it is transmitted from the RS 208 and a second Q-ordered filter to identify a Q-ordered set when it is received from the PMA sublayer 222. However, the standard predefines only two specific Q-ordered sets: ||LF|| (/K28.4/D0.0/D0.0/D1.0/) for a local fault signal and ||RF||(/K28.4/D0.0/D0.0/D2.0/). In the present invention, the first and second Q-ordered filters can be programmed to identify both the standard-defined Q-ordered sets and other-defined Q-ordered sets. The other-defined Q-ordered sets can be programmed within the network device (e.g., one time programmable), capable of being programmed by a user (e.g., reprogrammable), or both. Because the other-defined Q-ordered sets are communicated along transmit bus 302 or receive bus 304, link signaling via the present invention is in-band. Such programmable Q-ordered filters extend the ability of the network device to support communications among nodes when their transceivers are in idle mode.

Figure 7:
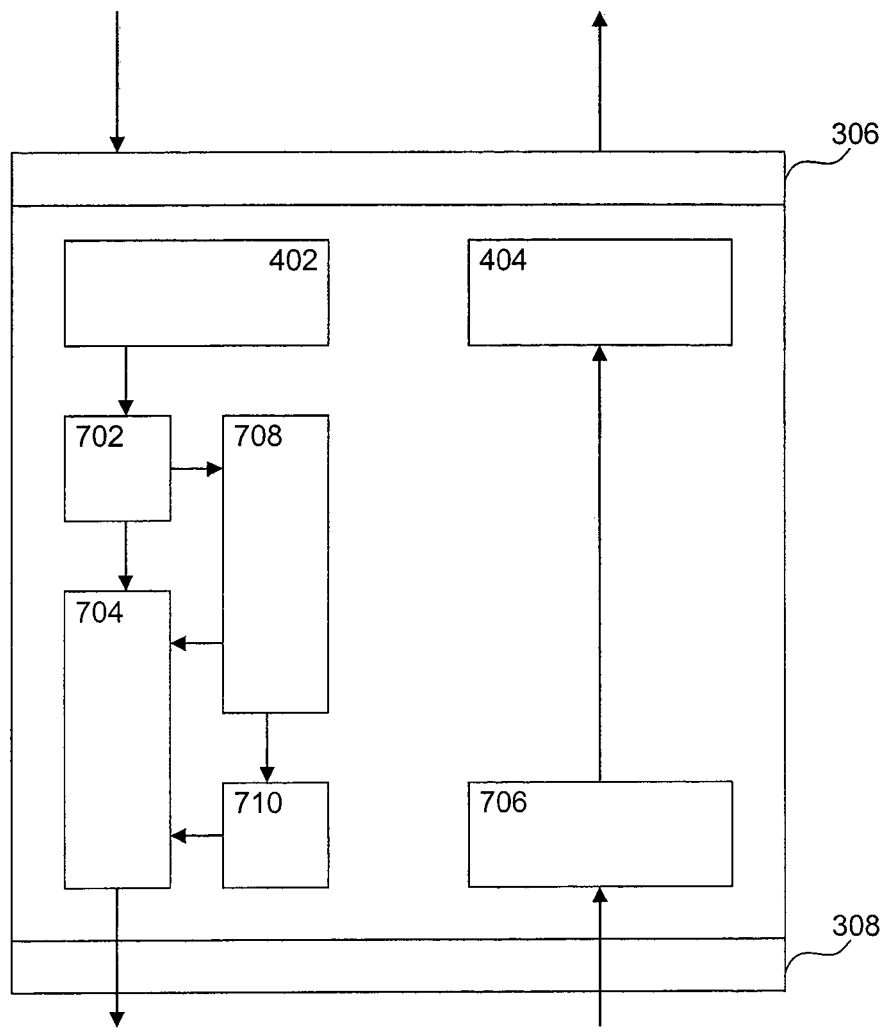
FIG. 7 is a block diagram of a network device 700 for implementing an IEEE Std 802.3ae PCS 220 in the manner of the present invention.

FIG. 7 is a block diagram of a network device 700 for implementing an IEEE Std 802.3ae PCS 220 in the manner of the present invention. Network device 700 comprises PCS service interface 306, PMA service interface 308, Encoders 402, Decoders 404, a first logic circuit 702, a second logic circuit 704, a third logic circuit 706, and a memory 708. Encoders 402 are coupled to PCS service interface 306 and are configured to encode 36 bits of an XGMII character into four lanes of code groups. PMA service interface 308 is coupled to Encoders 402. Decoders 404 are coupled between PCS service interface 306 and PMA service interface 308 and are configured to decode the four lanes of the code groups into an XGMII character.

First logic circuit 702 (a first Q-ordered filter) is coupled between PCS service interface 306 and PMA service interface 308 and is configured to identify an ordered set received from an RS 208. The ordered set complies with IEEE Std 802.3ae specifications for ordered sets. The ordered set is different from ordered sets predefined by IEEE Std 802.3ae. Memory 708 is coupled to first logic circuit 702 and is configured to store the ordered set. Second logic circuit 704 is coupled to first logic circuit 702 and is configured to ensure that the ordered set is transmitted in place of a K-ordered set or an R-ordered set during a clock cycle following a transmission of an A-ordered set. Third logic circuit 706 (a second Q-ordered filter) is coupled between PCS service interface 306 and PMA service interface 308 and is configured to identify the ordered set received from the PMA sublayer 222.

An identity of the ordered set can be preprogrammed within at least one of first logic circuit 702 and third logic circuit 706. An identity of the ordered set can be capable of being programmed by a user. At least one of first logic circuit 702 and third logic circuit 706 can also be further configured to identify an ordered set from the ordered sets predefined by IEEE Std 802.3ae.

Memory 708 can comprise a queue configured to store more than one ordered set. A fourth logic circuit 710 can be coupled to second logic circuit 704 and configured to differentiate among the ordered sets stored in the queue and to cause a first ordered set to be transmitted before a second ordered set according to a hierarchy.

In a first embodiment, the present invention provides the RS 208 with additional capabilities for responding to a local or remote fault. Under IEEE Std 802.3ae, link status reporting is performed to identify and convey link status conditions to the RS 208 so that it can take actions to activate or deactivate a link. Thus, detection of a remote fault condition, for example, ordinarily would cause the RS 208 to take actions to deactivate the link from which the fault was detected, to generate an RF-ordered set, and to transmit it to the PCS 220.

However, with the first embodiment, several RF-ordered sets can be defined such that each identifies a specific cause for the remote fault condition.

For example, suppose that in FIG. 1 the connections between node I 102 and II 104 are crossed such that lane 0 of node I 102 is connected to lane 1 of node II 104, lane 1 of node I 102 is connected to lane 2 of node II 104, lane 2 of node I 102 is connected to lane 3 of node II 104, and lane 3 of node I 102 is connected to lane 0 of node II 104. Although node I 102 would detect a remote fault condition at node II 104, the cause of this condition could also be identified. In this case, adjustments could be made to messages communicated between node I 102 and node II 104 such that the RS 208 at node I 102 would not need to deactivate the link to node II 104. Furthermore, a tailored RF-ordered set such as, for example, /K28.4/D0.0/D1.0/D2.0/could be generated by the RS 208 and transmitted to the PCS 220, which could transmit this tailored RF-ordered set to other link partners. Thus, they likewise would also be able to identify the cause of the remote fault condition at node II 104 and (if needed) to make adjustments to messages communicated to node II 104.

Note that in the first embodiment, special code group K28.4 in lane 0 is still used to alert the PCS 220 that a Sequence ordered set is being transmitted, and data code group D2.0 in lane 3 still identifies the Sequence ordered set as a remote fault signal. Data code groups in lanes 1 and 2 are used to identify the cause of the remote fault condition. This provides for the identification of 65,536 different causes for each of a local and a remote fault. Advantageously, in the first embodiment, programming of the Q-ordered filters 702 and 706 can be limited to lanes 1 and 2.

Providing several RF-ordered sets (or several LF-ordered sets or both) allows the RS 208 to determine whether the link needs to be deactivated or whether adjustments can be made to correct or otherwise overcome the remote fault condition. The skilled artisan will recognize other local and remote fault conditions that could be corrected or overcome in the manner of the first embodiment. Therefore, the present invention is not limited to the example presented above.

In a second embodiment, the present invention provides the RS 208 with additional capabilities for communicating with other nodes when their transceivers are in idle mode. Under IEEE Std 802.3ae, a Q-ordered set is distinguished by having special code group K28.4 in lane 0 followed by three data code groups in lanes 1, 2, and 3: /K28.4/Dx.y/Dx.y/Dx.y/ (see FIG. 6). Recall that in FIG. 6, use of data code group "Dx.y" at a position in a sequence indicates that any data code group can be used in that lane. Each data code group corresponds to eight data bits from an XGMII character. Thus, IEEE Std 802.3ae provides for 16,777,216 different Q-ordered sets. Of these, only two are predefined by the standard (||LF|| (/K28.4/D0.0/D0.0/D1.0/) for a local fault signal and ||RF|| (/K28.4/D0.0/D0.0/D2.0/) for a remote fault signal). This leaves available 16,777,214 Q-ordered sets that can be preprogrammed within the network device (e.g., one time programmable), capable of being programmed by a user (e.g., reprogrammable), or both for managing a portion of the LAN 100.

For example, suppose that in FIG. 1 transceiver i 108 has been in idle mode for a long period of time. In this situation, it might be desirable to place node I 102 in a low power status (or to deactivate node I 102) and to communicate this change in status to other nodes on LAN 100. Here, a specific Q-ordered set such as, for example, /K28.4/D1.2/D3.4/D5.6/could be generated by the RS 208 of node I 102 and transmitted to the PCS 220, which could transmit this specific Q-ordered set to other link partners. Advantageously, the specific Q-ordered set could be any of the available 16,777,214 Q-ordered sets.

Note that in the second embodiment, special code group K28.4 in lane 0 is still used to alert the PCS 220 that a Sequence ordered set is being transmitted. Data code groups in lanes 1, 2, and 3 are used to define the specific Q-ordered set. Thus, in the second embodiment, programming of the Q-ordered filters 702 and 706 can be limited to lanes 1, 2, and 3. The skilled artisan will recognize other LAN conditions that could be managed in the manner of the second embodiment. Therefore, the present invention is not limited to the example presented above.

In a third embodiment, the present invention provides the RS 208 with further additional capabilities for communicating with other nodes when their transceivers are in idle mode. For every combination of nine bits (a control bit and eight data bits), IEEE Std 802.3ae delineates which combinations produce valid code groups. Recall that FIG. 5 presents tables of IEEE Std 802.3ae valid code groups. Code groups with bit combinations not specified in FIG. 5 are invalid. The standard also predefines certain sequences of four valid code groups to be ordered sets. Recall that FIG. 6 presents a table of predefined IEEE Std 802.3ae ordered sets.

Network devices can implement the requirements of IEEE Std 802.3ae in any manner they choose. They are also free to include other processes so long as these do not conflict with the standard. Network devices that meet these criteria are said to be compliant with the standard. In this sense, a Q-ordered set need not be limited to the IEEE Std 802.3ae designation as having special code group K28.4 in lane 0 followed by three data code groups in lanes 1, 2, and 3: /K28.4/Dx.y/Dx.y/Dx.y/ (see FIG. 6). Rather, the designation of a Q-ordered set can be expanded to include any ordered set that a programmable Q-ordered filter 702 or 706 can recognize as a Q-ordered set, while remaining compliant with IEEE Std 802.3ae. A programmable Q-ordered filter 702 or 706 can recognize as a Q-ordered set any ordered set that is different from the ordered sets predefined by IEEE Std 802.3ae. For example, a Q-ordered filter 702 or 706 can be programmed to recognize ordered set /D0.1/K27.7/D2.3/D4.5/as a Q-ordered set. Advantageously, this provides for over four billion different Q-ordered sets. Note that in the third embodiment, special code group K28.4 in lane 0 is not necessarily used to alert the PCS 220 that a Sequence ordered set is being transmitted. Thus, in the third embodiment, programming of the Q-ordered filters 702 and 706 extends to all lanes: lanes 0, 1, 2, and 3.

It will be understood that, in a sense, the first embodiment is a subset of the second embodiment, which in turn is a subset of the third embodiment. The three embodiments represent steps of increasing capabilities for communicating with other nodes when their transceivers are in idle mode. However, each step of increasing capabilities is realized at a cost of additional lanes that need to be programmed within the Q-ordered filter 702 or 706. As the number of Q-ordered sets rises, it is possible that the processing time needed to identify a Q-ordered set will also increase.

In a fourth embodiment, the present invention provides the PCS 220 with the ability to differentiate between the standard-defined Q-ordered sets (e.g., ||LF|| or ||RF||) and the other-defined Q-ordered sets. Recall that, under IEEE Std 802.3ae, when a local or remote fault is recognized or detected by the PCS 220 or the RS 208, the appropriate Q-ordered set (e.g., ||LF|| or ||RF||) is to be generated. The Q-ordered set received or generated by the PCS 220 is stored until the next A-ordered set is transmitted. Also recall that, when a transceiver is in idle mode, an A-ordered set is transmitted every $r^{th}$ clock cycle and that r can range from 16 to 31. Therefore, it is possible that, while a first Q-ordered set is being stored by the PCS 220 waiting for the next A-ordered set to be transmitted, a local or remote fault can be recognized that causes a second Q-ordered set (e.g., ||LF|| or ||RF||) to be generated.

In this situation, several Q-ordered sets may be stored by the PCS 220 in a queue while each awaits its opportunity to be transmitted after an A-ordered set. In the fourth embodiment, the first logic circuit 702 that comprises the first Q-ordered filter includes additional logic circuitry to differentiate between the standard-defined Q-ordered sets and the other-defined Q-ordered sets. The additional logic circuitry also causes a standard-defined Q-ordered set to be transmitted before any of the other-defined Q-ordered sets that are ahead of the standard-defined Q-ordered set in the queue.

Precedence of the standard-defined Q-ordered set recognizes that transmission of it is likely to be more urgent than transmission of the other-defined Q-ordered sets. Alternatively, the additional logic circuitry could be configured to rank all Q-ordered sets stored in the queue according to a hierarchy. The hierarchy can be determined by an algorithm. Under such a hierarchy it is possible that certain other-defined Q-ordered sets would have precedence over one or more of the standard-defined Q-ordered sets, vice versa, or both. It will be recognized that the fourth embodiment can be used in conjunction with any of the first, second, or third embodiments.

Advantageously, each of the embodiments facilitates the transmission of secured messages. For example, suppose that in FIG. 1 the PCS 220 of node I 102 and the PCS 220 of node III 106 have programmed Q-ordered filters 702 and 706 that recognize a particular Q-ordered set, but the PCS 220 of node II 104 has a programmed Q-ordered filter 706 or 710 (or a standard-defined Q-ordered filter 702 or 706) that does not recognize the particular Q-ordered set. Thus, when transceivers i 108, ii 110, and iii 112 are in idle mode, the particular Q-ordered set can be generated at node I 102, communicated across physical medium 120 through transceivers i 108, ii 110, and iii 112, and recognized at node III 106. Transceiver ii 110 would be involved in the process of communicating the particular Q-ordered set between node I 102 and node III 106. However, because the particular Q-ordered set would not be recognized by the PCS 220 of node II 104, node II 104 would merely receive the particular Q-ordered set from node I 102 and transmit the particular Q-ordered set to node III 106. Node II 104 would neither "understand" the particular Q-ordered set nor initiate any action upon receiving it. In this sense, the particular Q-ordered set is a secured message communicated from node I 102 to node III 106 via node II 104 in a manner that prevents node II 104 from recognizing the message.

Figure 8A:
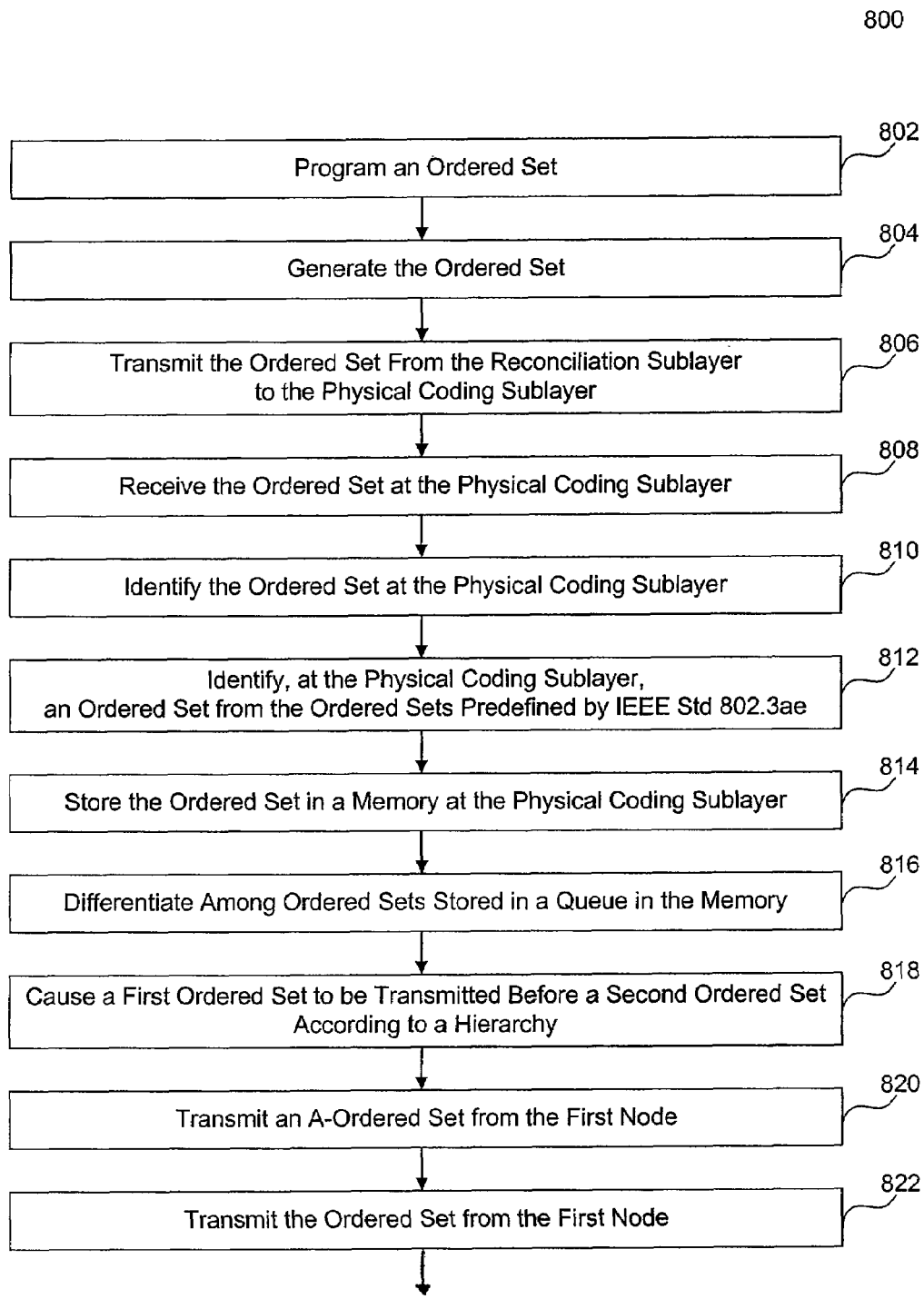
FIGS. 8A and 8B show a flow chart of a method 800 for communicating, in the manner of the present invention, between a first node coupled to a first transceiver and a second node coupled to a second transceiver when the first and the second transceivers are in idle mode.
Figure 8B:
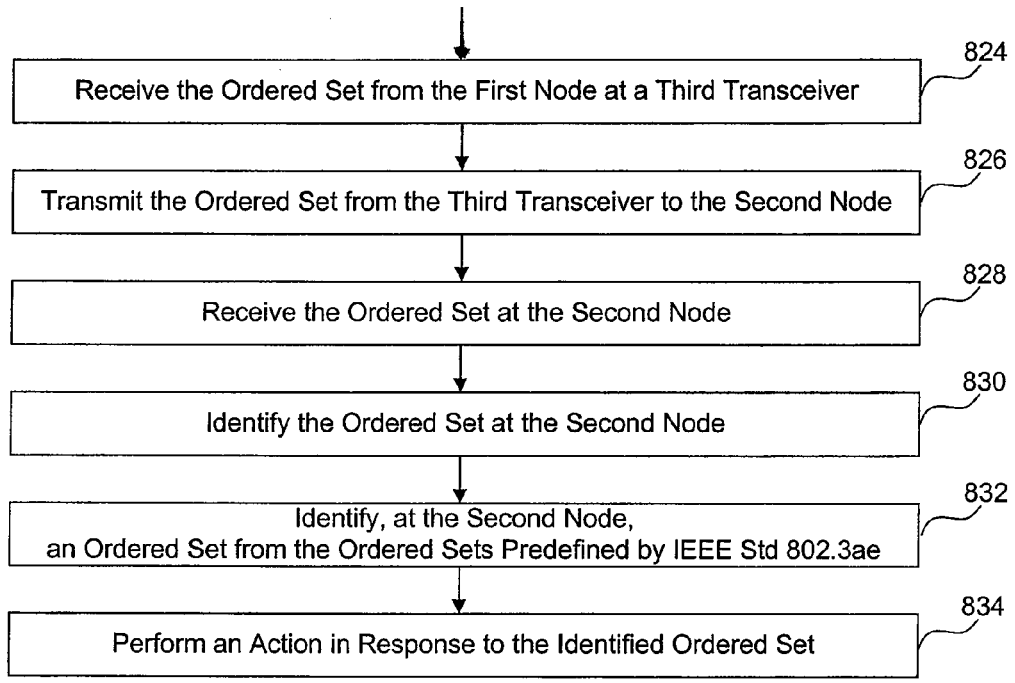

FIGS. 8A and 8B show a flow chart of a method 800 for communicating, in the manner of the present invention, between a first node coupled to a first transceiver and a second node coupled to a second transceiver when the first and the second transceivers are in idle mode. In method 800, at an optional step 802, a user programs an ordered set. Alternatively, the ordered set can be preprogrammed within a PCS. The ordered set complies with IEEE Std 802.3ae specifications for ordered sets. The ordered set is different from ordered sets predefined by IEEE Std 802.3ae. The ordered set can be a Q-ordered set. A code group in lane 3 of the Q-ordered set can be 000000001 or 000000010. The ordered set can be used to identify a cause of a link status condition.

At a step 804, the ordered set is generated. The ordered set can be generated upon recognizing or detecting the link status condition. More specifically, the ordered set can be generated upon recognizing or detecting the cause of a link status condition. The ordered set can be generated by a PCS of the first node or an RS of the first node. If the ordered set is generated by the RS, then method 800 proceeds to a step 806. Otherwise, method 800 proceeds to a step 814. At step 806, the ordered set is transmitted from the RS to the PCS. At a step 808, the ordered set is received at the PCS. At a step 810, the ordered set is identified at the PCS. At a step 812, an ordered set from the ordered sets predefined by IEEE Std 802.3ae can also be identified at the PCS. For example, a logic circuit can be used to identify both the ordered set and an ordered set from the ordered sets predefined by IEEE Std 802.3ae.

If the ordered set cannot be transmitted immediately, it is, at step 814, stored in a memory at the PCS. More than one ordered set can be stored in a queue in the memory. Optionally, at a step 816, the ordered sets stored in the queue in the memory are differentiated. Optionally, at a step 818, a first ordered set is caused to be transmitted before a second ordered set according to a hierarchy. In the hierarchy, an ordered set from the ordered sets predefined by IEEE Std 802.3ae can have precedence over the ordered set, vice versa, or both. For example, another logic circuit can be used to differentiate among the ordered sets stored in the queue in the memory and to cause the first ordered set to be transmitted before the second ordered set according to the hierarchy.

At a step 820, an A-ordered set is transmitted from the first node. At a step 822, the ordered set is transmitted from the first node. If a third transceiver, coupled to a third node, is positioned between the first and the second transceivers, then method 800 can optionally proceed to a step 824. At step 824, the ordered set from the first node is received by the third transceiver. At a step 826, the ordered set is transmitted from the third transceiver to the second node. However, the third node is incapable of identifying the ordered set.

At a step 828, the ordered set is received at the second node. At a step 830, the ordered set is identified at the second node. At a step 832, an ordered set from the ordered sets predefined by IEEE Std 802.3ae can also be identified at the second node. For example, another logic circuit can be used to identify both the ordered set and an ordered set from the ordered sets predefined by IEEE Std 802.3ae. Optionally, at a step 834, an action is performed in response to the identified ordered set.

Figure 9:
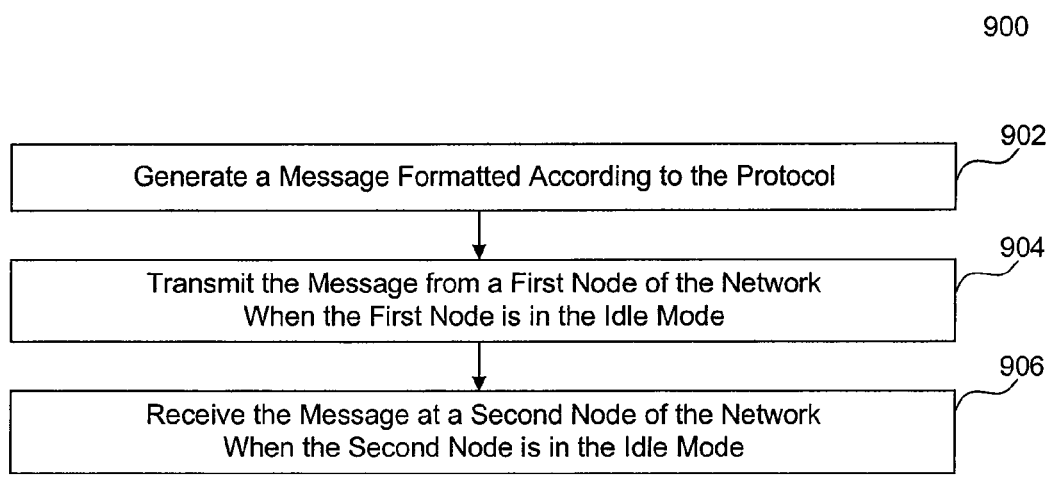
FIG. 9 shows a flow chart of a method 900 of communicating in a network between nodes in an idle mode.

FIG. 9 shows a flow chart of a method 900 of communicating in a network between nodes in an idle mode. The nodes operate according to a protocol that defines a node as being in the idle mode when the node is not transmitting or receiving a packet. In method 900, at a step 902, a message formatted according to the protocol is generated. The message is different from messages predefined by the protocol for transmission during the idle mode. For example, the message can comprise a first portion that reports a link status condition. The message can further comprise a second portion that reports a cause of the link status condition. At a step 904, the message is transmitted from a first node of the network when the first node is in the idle mode. At a step 906, the message is received at a second node of the network when the second node is in the idle mode.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In a local area network, a method for communicating using a 10 Gigabit Media Independent Interface, between a first hardware node coupled to a first transceiver and a second hardware node coupled to a second transceiver when the first and the second transceivers are in idle mode, comprising the steps of:
   (1) transmitting an A-ordered set from the first hardware node;
   (2) transmitting an ordered set from the first hardware node after said transmitted A-ordered set and during an idle mode; and
   (3) receiving the ordered set at the second hardware node; wherein:
      the ordered set complies with IEEE Std 802.3ae™ specifications for ordered sets; and
      the ordered set is different from ordered sets predefined by the IEEE Std 802.3ae specifications.

2. The method of claim 1, wherein the ordered set is a Q-ordered set.

3. The method of claim 2, wherein a code group in a lane 3 of the Q-ordered set is one of 000000001 and 000000010.

4. The method of claim 1, wherein the ordered set is preprogrammed within a Physical Coding Sublayer.

5. The method of claim 1, wherein the ordered set is capable of being programmed by a user.

6. The method of claim 1, further comprising the step of: storing the ordered set in a memory at a Physical Coding Sublayer of the first hardware node.

7. The method of claim 6, wherein more than one ordered set is stored in a queue in the memory, and further comprising the steps of:
   (a) differentiating among the more than one ordered set stored in the queue in the memory; and
   (b) causing a first ordered set to be transmitted before a second ordered set according to a hierarchy.

8. The method of claim 7, wherein an ordered set from the ordered sets predefined by the IEEE Std 802.3ae specifications has precedence in the hierarchy over the ordered set.

9. The method of claim 1, further comprising the step of: generating the ordered set.

10. The method of claim 9, wherein said generated ordered set is generated upon recognizing a link status condition.

11. The method of claim 10, wherein said generated ordered set is generated upon recognizing a cause of the link status condition.

12. The method of claim 11, wherein the ordered set is used to identify the cause of the link status condition.

13. The method of claim 9, wherein said generated ordered set is generated upon detecting a link status condition.

14. The method of claim 13, wherein said generated ordered set is generated upon detecting a cause of the link status condition.

15. The method of claim 14, wherein the ordered set is used to identify the cause of the link status condition.

16. The method of claim 9, wherein said generated ordered set is generated at a Physical Coding Sublayer of the first hardware node.

17. The method of claim 9, wherein said generated ordered set is generated at a Reconciliation Sublayer of the first hardware node, and further comprising the steps of:
   (a) transmitting the ordered set from the Reconciliation Sublayer to a Physical Coding Sublayer of the first hardware node;
   (b) receiving the ordered set at the Physical Coding Sublayer; and
   (c) identifying the ordered set at the Physical Coding Sublayer.

18. The method of claim 17, further comprising the step of: identifying an ordered set from the ordered sets predefined by the IEEE Std 802.3ae specifications at the Physical Coding Sublayer.

19. The method of claim 1, further comprising the step of: identifying the ordered set at the second hardware node.

20. The method of claim 19, further comprising the step of: identifying an ordered set from the ordered sets predefined by the IEEE Std 802.3 specifications at the second hardware node.

21. The method of claim 19, further comprising the step of: performing an action in response to said identified ordered set.

22. The method of claim 19, wherein a third transceiver, coupled to a third hardware node, is positioned between the first and the second transceivers, and further comprising the steps of:
   (a) receiving, at the third transceiver, the ordered set from the first hardware node;
   (b) transmitting, from the third transceiver, the ordered set to the second hardware node;
   wherein the third hardware node is incapable of identifying the ordered set.

23. A network device for implementing an IEEE Std 802.3ae™ Physical Coding Sublayer, comprising:
   a Physical Coding Sublayer service interface;
   Encoders coupled to said Physical Coding Sublayer service interface and configured to encode a 10 Gigabit Media Independent Interface character into code groups;
   a Physical Medium Attachment service interface coupled to said Encoders;
   Decoders coupled between said Physical Coding Sublayer service interface and said Physical Medium Attachment service interface and configured to decode said code groups into said 10 Gigabit Media Independent Interface character;
   a first logic circuit coupled between said Physical Coding Sublayer service interface and said Physical Medium Attachment service interface and configured to identify an ordered set received from a Reconciliation Sublayer;
   a memory coupled to said first logic circuit and configured to store said ordered set;
   a second logic circuit coupled to said first logic circuit and configured to ensure that said ordered set is substituted for one of a K-ordered set and an R-ordered set and transmitted during a clock cycle following a transmission of an A-ordered set and during an idle mode; and
   a third logic circuit coupled between said Physical Coding Sublayer service interface and said Physical Medium Attachment service interface and configured to identify said ordered set received from a Physical medium Attachment sublayer;
   wherein:
      said ordered set complies with IEEE Std 802.3ae™ specifications for ordered sets; and
      said ordered set is different from ordered sets predefined by said IEEE Std 802.3ae specifications.

24. The network device of claim 23, wherein an identify of said ordered set is preprogrammed within at least one of said first logic circuit and said third logic circuit.

25. The network device of claim 23, wherein an identify of said ordered set is capable of being programmed by a user.

26. The network device of claim 23, wherein at least one of said first logic circuit and said third logic circuit is further configured to identify an ordered set from said ordered sets predefined by said IEEE Std 802.3ae specifications.

27. The network device of claim 23, wherein said memory comprising a queue configured to store more than one said ordered set, and further comprising a fourth logic circuit coupled to said second logic circuit and configured to differentiate among said more than one said ordered set stored in said queue and to cause a first ordered set to be transmitted before a second ordered set according to a hierarchy.

28. In a network having hardware nodes that operate according to a protocol that defines a hardware node as being in an idle mode when the hardware node is not transmitting or receiving a packet, a method of communicating between the hardware nodes during the idle mode, comprising the steps of:

(1) generating a message formatted according to the protocol;
(2) transmitting the message from a first hardware node of the network when the first hardware node is in the idle mode; and
(3) receiving the message at a second hardware node of the network when the second hardware node is in the idle mode;

wherein the message is different from the messages predefined by the protocol for transmission during the idle mode.

29. The method of claim 28, wherein the message comprises a first portion that reports a link status condition.

30. The method of claim 29, wherein the message further comprises a second portion that reports a cause of the link status condition.

* * * * *

UNITED STATES PATENT AND TRADEMARK OFFICE
CERTIFICATE OF CORRECTION

PATENT NO. : 7,664,134 B2 Page 1 of 1
APPLICATION NO. : 10/667604
DATED : February 16, 2010
INVENTOR(S) : Maurice Caldwell It is certified that error appears in the above-identified patent and that said Letters Patent is hereby corrected as shown below:

Column 13, line 21, please change "802.3ae" to --802.3ae™--.
Column 13, line 41, please change "802.3ae" to --802.3ae™--.
Column 14, line 7, please change "802.3ae" to --802.3ae™--.
Column 14, line 13, please change "802.3" to --802.3ae™--.
Column 14, line 62, please change "802.3ae" to --802.3ae™--.
Column 15, line 4, please change "802.eae" to --802.3ae™--.

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,664,134 B2  Page 1 of 1
APPLICATION NO. : 10/667604
DATED : February 16, 2010
INVENTOR(S) : Caldwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1879 days.

Signed and Sealed this

Thirtieth Day of November, 2010

David J. Kappos
*Director of the United States Patent and Trademark Office*